(12) United States Patent
Hann

(10) Patent No.: US 11,811,502 B2
(45) Date of Patent: Nov. 7, 2023

(54) TIMING SYSTEM AND A METHOD FOR RECEIVING CLOCK INFORMATION FROM A SATELLITE SYSTEM

(71) Applicant: Adtran Networks SE, Martinsried/Munich (DE)

(72) Inventor: Kenneth Hann, Espoo (FI)

(73) Assignee: ADTRAN NETWORKS SE, Martinsried/Munich (DE)

( * ) Notice: Subject to any disclaimer, the term of this patent is extended or adjusted under 35 U.S.C. 154(b) by 109 days.

(21) Appl. No.: 17/554,715

(22) Filed: Dec. 17, 2021

(65) Prior Publication Data

US 2022/0255654 A1    Aug. 11, 2022

(30) Foreign Application Priority Data

Feb. 5, 2021   (EP) .................................... 21155418

(51) Int. Cl.
*H04J 3/06*    (2006.01)
*H04B 7/185*    (2006.01)

(52) U.S. Cl.
CPC ........ *H04J 3/0667* (2013.01); *H04B 7/18513* (2013.01); *H04B 7/18589* (2013.01); *H04J 3/0682* (2013.01)

(58) Field of Classification Search
CPC ........ H04J 3/0667; H04J 3/067; H04J 3/0682; H04J 3/0644; H04B 7/18513; H04B 7/18589; H04W 56/0015; H04W 56/004
See application file for complete search history.

(56) References Cited

U.S. PATENT DOCUMENTS

| | | | |
|---|---|---|---|
| 8,954,609 B1* | 2/2015 | Holleman | H04J 3/0667 709/227 |
| 10,439,712 B2* | 10/2019 | Mehrvar | H04B 10/25891 |
| 2011/0075685 A1* | 3/2011 | Xu | H04L 27/2672 370/503 |

(Continued)

FOREIGN PATENT DOCUMENTS

| | | |
|---|---|---|
| CN | 101 888 695 | 10/2013 |
| CN | 104 660 330 | 5/2015 |

OTHER PUBLICATIONS

Search Report for EP21155418 dated Jul. 23, 2021, 2 pages.

*Primary Examiner* — Ricky Q Ngo
*Assistant Examiner* — Kabir U Jahangir
(74) *Attorney, Agent, or Firm* — NIXON & VANDERHYE

(57) ABSTRACT

An outdoor device of a timing system includes a receiver for receiving clock information from a satellite system, a processing system for running master functionality of a clock synchronization protocol to transfer the clock information to an indoor device of the timing system, and a transceiver for transferring data between the outdoor device and the indoor device. A memory device stores a fixed delay value estimating a time delay from a reception moment of a request message related to the clock synchronization protocol to a transmission moment of a reply message. There is no need to compute a difference between clock times corresponding to the reception moment and the transmission moment because the fixed delay value is used in lieu of the difference in the clock synchronization protocol. Thus, quality requirements related to an oscillator of the outdoor device can be mitigated.

18 Claims, 3 Drawing Sheets

(56) References Cited

U.S. PATENT DOCUMENTS

| | | | |
|---|---|---|---|
| 2011/0150005 A1* | 6/2011 | Chen | H04J 3/0667 370/503 |
| 2012/0128369 A1* | 5/2012 | Hann | H03L 7/07 398/154 |
| 2014/0145875 A1* | 5/2014 | Hann | H04W 56/00 342/352 |

* cited by examiner

TIMING SYSTEM AND A METHOD FOR RECEIVING CLOCK INFORMATION FROM A SATELLITE SYSTEM

CROSS-REFERENCE

This application claims priority to European Patent Application No. 21155418.3, filed on Feb. 5, 2021, the entire contents of which are hereby incorporated by reference.

BACKGROUND OF THE INVENTION

Field of the Invention

The disclosure relates generally to receiving clock information from a satellite system. More particularly, the disclosure relates to a timing system for receiving clock information from a satellite system. Furthermore, the disclosure relates to a method for receiving clock information from a satellite system. Furthermore, the disclosure relates to an outdoor device for a timing system configured to receive clock information from a satellite system. Furthermore, the disclosure relates to a computer program for receiving clock information from a satellite system.

Description of the Related Art

In many data transfer networks, there is a need to produce clock information based on one or more satellite signals received from a satellite system. The satellite system can be a Global Navigation Satellite System "GNSS" that can be for example the US Global Positioning System "GPS", the Russian Globalnaja navigatsionnaja sputnikovaja Sistema "GLONASS", the European Galileo system, or the Chinese Beidou system.

Accurate clock information requires a source of stable frequency and an accurate source of clock time. In many cases, stable frequency sources require temperature-controlled environments inside a building. Accurate time from a satellite system requires that antennas for receiving signals from the satellite system are roof mounted outdoors. Typically, a timing system for providing accurate clock information, e.g. enhanced Primary Reference Time Clock "ePRTC", comprises an indoor device and an outdoor device with connecting cables.

Traditionally, a Radio Frequency "RF" cable is used to carry a satellite signal from an outdoor antenna location to a clock receiver that is located indoors. Furthermore, there are also implementations where a satellite signal receiver together with a precision time protocol "PTP" grandmaster are placed in an outdoor device outside a building. In the first above-mentioned case, an oscillator is in a stable environment, but the cable delay is challenging to compensate and typically results in high installation costs and offsets due to compensation errors. In the second above-mentioned case, the cable delay can be accurately compensated for by using a two-way clock synchronization protocol, e.g. IEEE1588, but the oscillator is in a harsh environment. Due to less stable frequency, the achievable time accuracy is limited. The "IEEE" is an abbreviation of the Institute of Electrical and Electronics Engineers.

SUMMARY OF THE INVENTION

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments.

In accordance with the invention there is provided a new outdoor device for a timing system configured to receive clock information from a satellite system. The satellite system can be a Global Navigation Satellite System "GNSS" that can be for example the US Global Positioning System "GPS", the Russian GLONASS, the European Galileo system, or the Chinese Beidou system.

An outdoor device according to the invention comprises:
- a receiver configured to receive the clock information from the satellite system,
- a processing system configured to run master functionality of a clock synchronization protocol to transfer the clock information to an indoor device of the timing system,
- a transceiver configured to transfer, via a data transfer link, data between the outdoor device and the indoor device in accordance with the clock synchronization protocol, and
- a memory device configured to store a fixed delay value estimating a time delay from a moment of reception of a request message related to the clock synchronization protocol at the transceiver to a moment of transmission of a reply message from the transceiver to the indoor device.

The above-mentioned processing system of the outdoor device is configured to include the fixed delay value into the reply message to be transmitted. There is no need to compute a difference between clock times corresponding to the moment of reception of the request message and the moment of transmission of the reply message because the fixed delay value is used in lieu of the difference in the clock synchronization protocol. Thus, quality requirements related to an oscillator of the outdoor device can be reduced as the oscillator does not need to maintain a time scale.

In accordance with the invention there is provided also a new timing system for receiving clock information from a satellite system. The timing system comprises:
- one or more outdoor devices according to the invention,
- an indoor device configured to run slave functionality of the clock synchronization protocol to receive the clock information from the one or more outdoor devices, and
- one or more data transfer links, e.g. cable links, each being configured to transfer data between one of the outdoor devices and the indoor device.

In accordance with the invention there is provided also a new method for receiving clock information from a satellite system. The method comprises:
- receiving, at an outdoor device of a timing system, the clock information from the satellite system,
- running, at the outdoor device, master functionality of a clock synchronization protocol to transfer the clock information to an indoor device of the timing system,
- storing, in a memory device of the outdoor device, a fixed delay value estimating a time delay from a moment of reception of a request message related to the clock synchronization protocol at the outdoor device to a moment of transmission of a reply message from the outdoor device,
- including the fixed delay value into the reply message to be transmitted, and transmitting the reply message from the outdoor device to the indoor device.

In accordance with the invention, there is provided also a non-transitory computer readable medium, e.g. an optical disc, encoded with a computer program for controlling an outdoor device of a timing system to receive clock information from a satellite system and to transfer the clock information to an indoor device of the timing system. The computer program comprises computer executable instructions for controlling a programmable processing system of the outdoor device to:

run master functionality of a clock synchronization protocol to transfer the clock information received from the satellite system to the indoor device of the timing system, read, from a memory device, a fixed delay value estimating a time delay from a moment of reception of a request message related to the clock synchronization protocol at the outdoor device to a moment of transmission of a reply message from the outdoor device, include the fixed delay value into the reply message to be transmitted, and control the outdoor device to transmit the reply message from the outdoor device to the indoor device.

In accordance with the invention, there is provided also a new computer program product. The computer program product comprises a non-transitory computer readable medium according to the invention.

Exemplifying and non-limiting embodiments are described in accompanied dependent claims.

Various exemplifying and non-limiting embodiments both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments and their advantages are explained in greater detail below in the sense of examples and with reference to the accompanying drawings, in which.

DESCRIPTION OF THE PREFERRED EMBODIMENTS

The specific examples provided in the description below should not be construed as limiting the scope and/or the applicability of the accompanied claims. Lists and groups of examples provided in the description are not exhaustive unless otherwise explicitly stated.

Figure 1A:
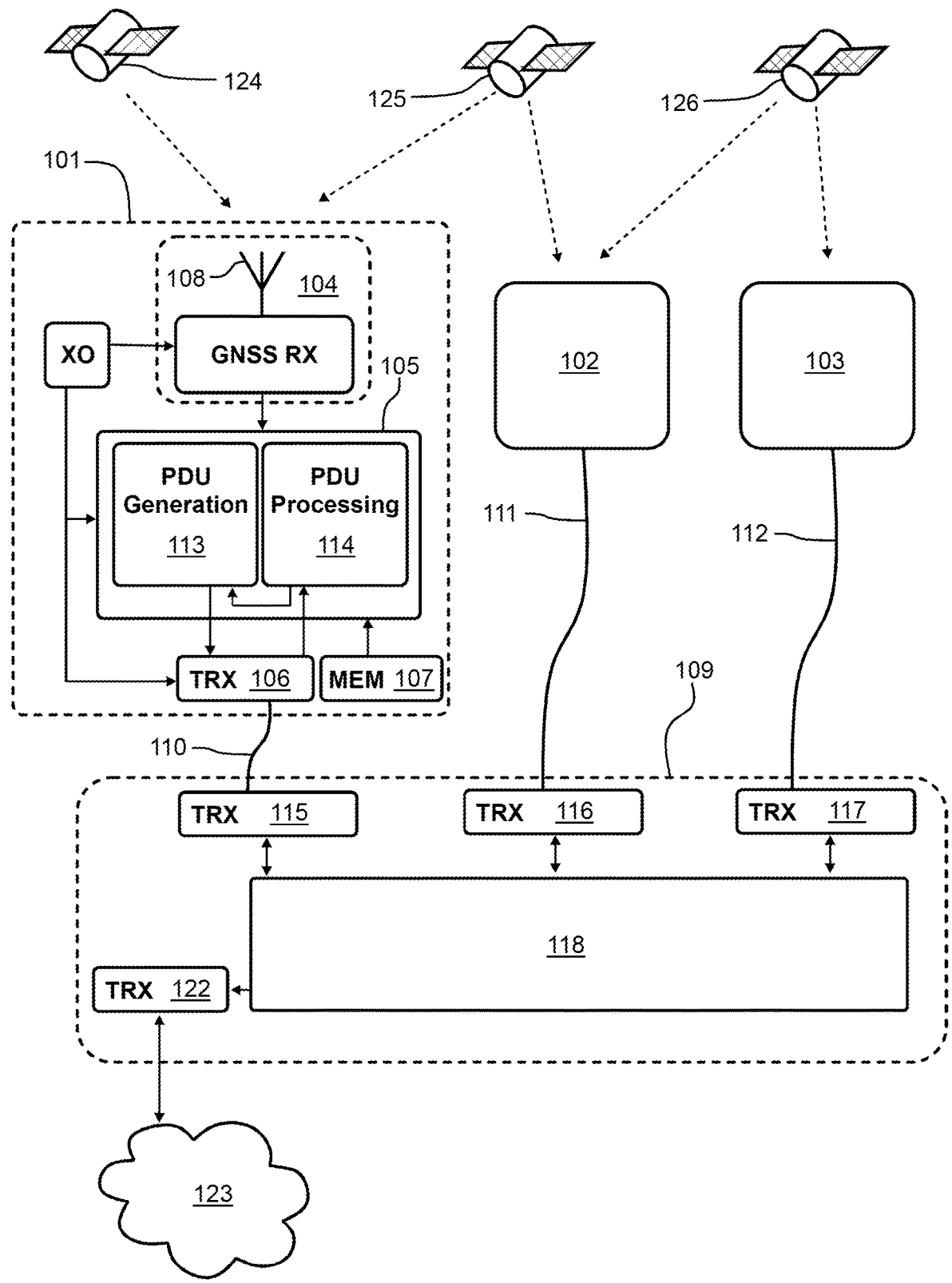
FIG. 1a illustrates a timing system comprising an outdoor device according to an exemplifying and non-limiting embodiment.

FIG. 1a illustrates a timing system according to an exemplifying and non-limiting embodiment for receiving clock information from a satellite system. In FIG. 1a, three satellites of the satellite system are denoted with figure references 124, 125, and 126. The timing system comprises outdoor devices 101, 102, and 103 and an indoor device 109. The outdoor device 101 is an outdoor device according to an exemplifying and non-limiting embodiment of the invention. Each of the outdoor devices 102 and 103 can be an outdoor device according to an exemplifying and non-limiting embodiment of the invention, e.g. such as the outdoor device 101, or an outdoor device according to the prior art. In the exemplifying timing system illustrated in FIG. 1a, the indoor device 109 comprises transceivers 115, 116, and 117 configured to receive data from the outdoor devices 101-103 via data transfer links 110, 111, and 112. In this exemplifying case, the data transfer links 110-112 are cable links. It is also possible that the data transfer links 110-112 are e.g. short-range radio links. The indoor device 109 comprises a processing system 118 which is configured to run slave functionality of a clock synchronization protocol to receive the clock information from each of the outdoor devices 101-103 and to form final clock information based on the clock information received from the outdoor devices 101-103. The clock synchronization protocol can be e.g. the clock synchronization protocol defined in the IEEE1588 specification, or some other suitable standardized or proprietary clock synchronization protocol. The indoor device 109 comprises a transceiver 122 configured to transfer data between the indoor device 109 and a data transfer network 123. In order to transfer the clock information to the data transfer network 123, the processing system 118 can be configured to run master functionality of a suitable clock synchronization protocol, e.g. the IEEE1588 clock synchronization protocol.

Figure 1B:
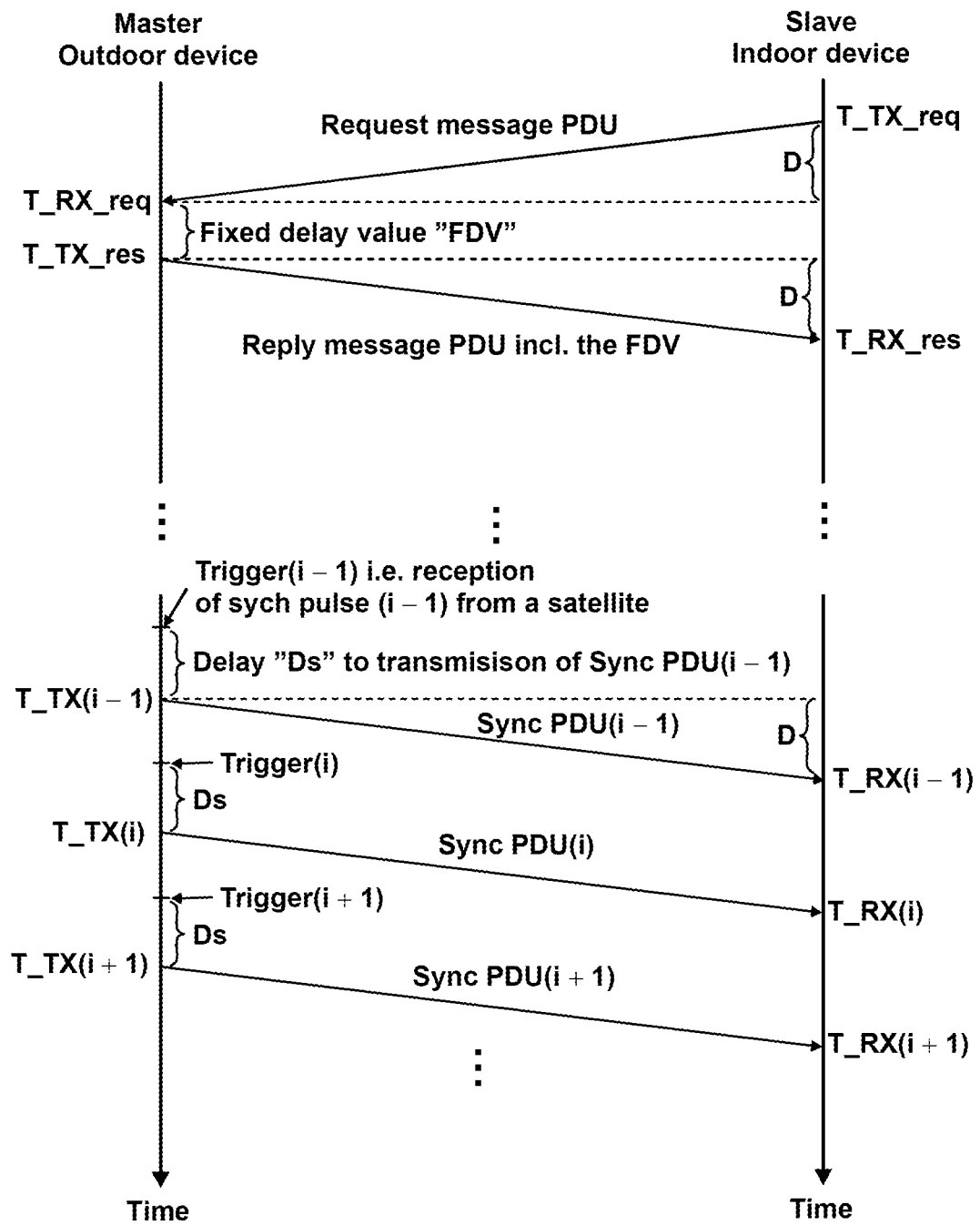
FIG. 1b illustrates functionality of a clock synchronization protocol run in the timing system illustrated in FIG. 1a, and FIG. 2 shows a flowchart of a method according to an exemplifying and non-limiting embodiment for receiving clock information from a satellite system.

In the following, the outdoor device 101 is described in more details. The outdoor device 101 comprises a receiver 104 configured to receive the clock information transmitted by one or more satellites of the satellite system. The outdoor device 101 comprises a processing system 105 that is configured to run the master functionality of the clock synchronization protocol in order to transfer the clock information to the indoor device 109. The outdoor device 101 comprises a transceiver 106 that is configured to transfer, via the data transfer link 110, data between the outdoor device 101 and the indoor device 109 in accordance with the clock synchronization protocol. The outdoor device 101 comprises a memory device 107 that stores a fixed delay value FDV estimating a time delay from a moment of reception of a request message related to the clock synchronization protocol at the transceiver 106 to a moment of transmission of a corresponding reply message from the transceiver 106. FIG. 1b illustrates the functionality of the clock synchronization protocol that is run between the outdoor device 101 and the indoor device 109. In FIG. 1b, the above-mentioned moment of reception of the request message is T_RX_req and the moment of transmission of the corresponding reply message is T_TX_res. Thus, the fixed delay value FDV estimates the time difference T_TX_res−T_RX_req which is the time needed by the outdoor device 101 to respond to the received reply message. In FIG. 1a, functional blocks which respond to the received reply message are a functional block 114 for processing received protocol data units "PDU", a functional block 113 for preparing protocol data units "PDU" to be transmitted, and the transceiver 106. The functional blocks 113 and 114 can be for example software implemented functional blocks run in a same hardware, or the functional blocks 113 and 114 can be implemented with separate hardware devices. The fixed delay value FDV can be e.g. pre-configured data. The processing system 105 is configured to include the fixed delay value into the reply message to be transmitted to the indoor device 109. The protocol data unit "PDU" can be e.g. an Ethernet frame or some other data transfer unit.

In a timing system according to an exemplifying and non-limiting embodiment, the indoor device 109 is configured to compute an estimate of a data transfer delay D in accordance with the following equation:

$$D=(T\_RX\_res-T\_TX\_req-FDV)/2, \qquad (1)$$

where T_TX_req is a moment of transmission of the request message and T_RX_res is a moment of reception of the corresponding reply message.

The outdoor device 101 is configured to transmit synchronization protocol data units to the indoor device 109 so that the transmission of each synchronization protocol data unit is triggered by the reception of a synchronization pulse from the satellite system. The synchronization pulse that is received from the satellite system can be for example a pulse per second "PPS" signal. In FIG. 1b, three successive synchronization protocol data units are denoted as Sync PDU(i−1), Sync PDU(i), and Sync PDU(i+1), where i is an integer indicative of a temporal order of the synchronization protocol data units. The indoor device 109 is able to know a moment of transmission of each synchronization protocol data unit based on the above-mentioned estimate of the data transfer delay D and a moment of reception of the synchronization protocol data unit under consideration. In FIG. 1b, the moments of transmission of the above-mentioned three successive synchronization protocol data units are denoted as T_TX(i−1), T_TX(i), and T_TX(i+1), and the corresponding moments of reception of these synchronization protocol data units are denoted as T_RX(i−1), T_RX(i), and T_RX(i+1). In this exemplifying case, T_TX(i−1)=T_RX(i−1)−D, T_TX(i)=T_RX(i)−D, and T_TX(i+1)=T_RX(i+1)−D.

In an outdoor device according to an exemplifying and non-limiting embodiment, the processing system 105 is configured to prepare a synchronization protocol data unit prior to a reception of a synchronization pulse from the satellite system and to control the transceiver 106 to transmit the prepared synchronization protocol data unit in response to the reception of the synchronization pulse from the satellite system. As the synchronization protocol data unit is prepared in advance, the delay from the reception of the synchronization pulse from the satellite system to the transmission of the synchronization protocol data unit can be compensated as the delay to output i.e. the transmission of the synchronization protocol data unit is known. Thus, variation in the delay can be minimized. In FIG. 1b, the delay is denoted as Ds.

Each trigger event that takes place at a reception of a synchronization pulse from the satellite system can be used for example to stop a transmit queue of other data traffic. For example, stopping the transmit queue may allow any protocol data unit of the other data traffic being transmitted to complete and thereafter no further other data traffic is allowed until the next synchronization protocol data unit has been sent. As illustrated in FIG. 1b, each synchronization protocol data unit is sent the fixed delay Ds after a corresponding trigger event. This fixed delay Ds allows for both the transfer of the synchronization protocol data unit to the physical media and the completion of transmission of any ongoing transmission of a protocol data unit of the other data traffic even if the size of the protocol data unit of the other data traffic were a maximum allowable size. The value of the fixed delay Ds can be compensated for example using the correction field defined in the clock synchronization protocol defined in the IEEE1588 specification. If the outdoor device has no other data traffic, the transmit queue stopping mechanism of the kind described above is not needed.

The equipment described above with reference to FIGS. 1a and 1b provides the following advantages: The above-described equipment uses only asynchronous external events with fixed known delays i.e. the above-mentioned fixed delay value FDV and the delay Ds from the reception of a synchronization pulse to the transmission of a corresponding synchronization protocol data unit. These delays FVD and Ds are so short that possible inaccuracy in a clock at the outdoor device does not cause a significant absolute error in operation. There is no need to maintain a time scale at the outdoor device, and no need for egress and ingress time stamping. Instead, in many cases, prior art equipment uses egress and ingress time stamping which requires maintaining a reference time clock "RTC" at an outdoor device.

In an outdoor device according to an exemplifying and non-limiting embodiment, the processing system 105 is configured to compute, prior to a reception of a synchronization pulse, a clock time value, e.g. date, hours, minutes, seconds, and fractions of a second, corresponding to the clock time at the upcoming moment of reception of the synchronization pulse. The processing system 105 is configured to include the computed clock time value into the synchronization protocol data unit when preparing the synchronization protocol data unit. For example, in a case in which a pulse per second "PPS" signal is received from the satellite system and the clock time value is e.g. X hours, Y minutes, and Z seconds at the reception of the latest pulse of the PPS signal, the processing system 105 can anticipate that the clock time will be X hours, Y minutes, and Z+1 seconds at the reception of the next pulse of the PPS signal. Thus, the processing system 105 can include the clock time value into the synchronization protocol data unit that will be transmitted in response to the reception of the next pulse of the PPS signal.

In an outdoor device according to an exemplifying and non-limiting embodiment, the processing system 105 is configured to run the master functionality of the clock synchronization protocol otherwise in accordance with the IEEE1588 specification but the processing system 105 is configured to include the fixed delay value FDV into each delay response message instead of a difference between the clock time at a moment of reception of the delay request message and the clock time at the moment of transmission of the corresponding delay response message. In this exemplifying case, the indoor device 109 can work e.g. in a case in which the outdoor device 101 is according to the above-mentioned embodiment and each of the outdoor devices 102 and 103 runs the ordinary IEEE1588 clock synchronization protocol.

In the exemplifying outdoor device 101 illustrated in FIG. 1a, the receiver 104 comprises an antenna 108 for receiving radio signals from the satellite system. It is also possible that the receiver 104 comprises a connector for connecting to an external antenna.

The processing system 105 which is schematically illustrated in FIG. 1b may comprise one or more processor circuits each of which can be a programmable processor circuit provided with appropriate software, a dedicated hardware processor such as for example an application specific integrated circuit "ASIC", or a configurable hardware processor such as for example a field programmable gate array "FPGA". The memory device 107 may comprise one or more memory circuits such as e.g. random-access memory "RAM" circuits.

The outdoor device 101 described above with reference to FIG. 1a can be deemed to be outdoor device that comprises:
- means for receiving clock information from a satellite system,
- means for running master functionality of a clock synchronization protocol to transfer the clock information to an indoor device,
- means for transferring, via a data transfer link, data between the outdoor device and the indoor device in accordance with the clock synchronization protocol,
- means for storing a fixed delay value estimating a time delay from a moment of reception of a request message related to the clock synchronization protocol at the outdoor device to a moment of transmission of a reply message from the outdoor device, and
- means for including the fixed delay value into the reply message to be transmitted.

Figure 2:
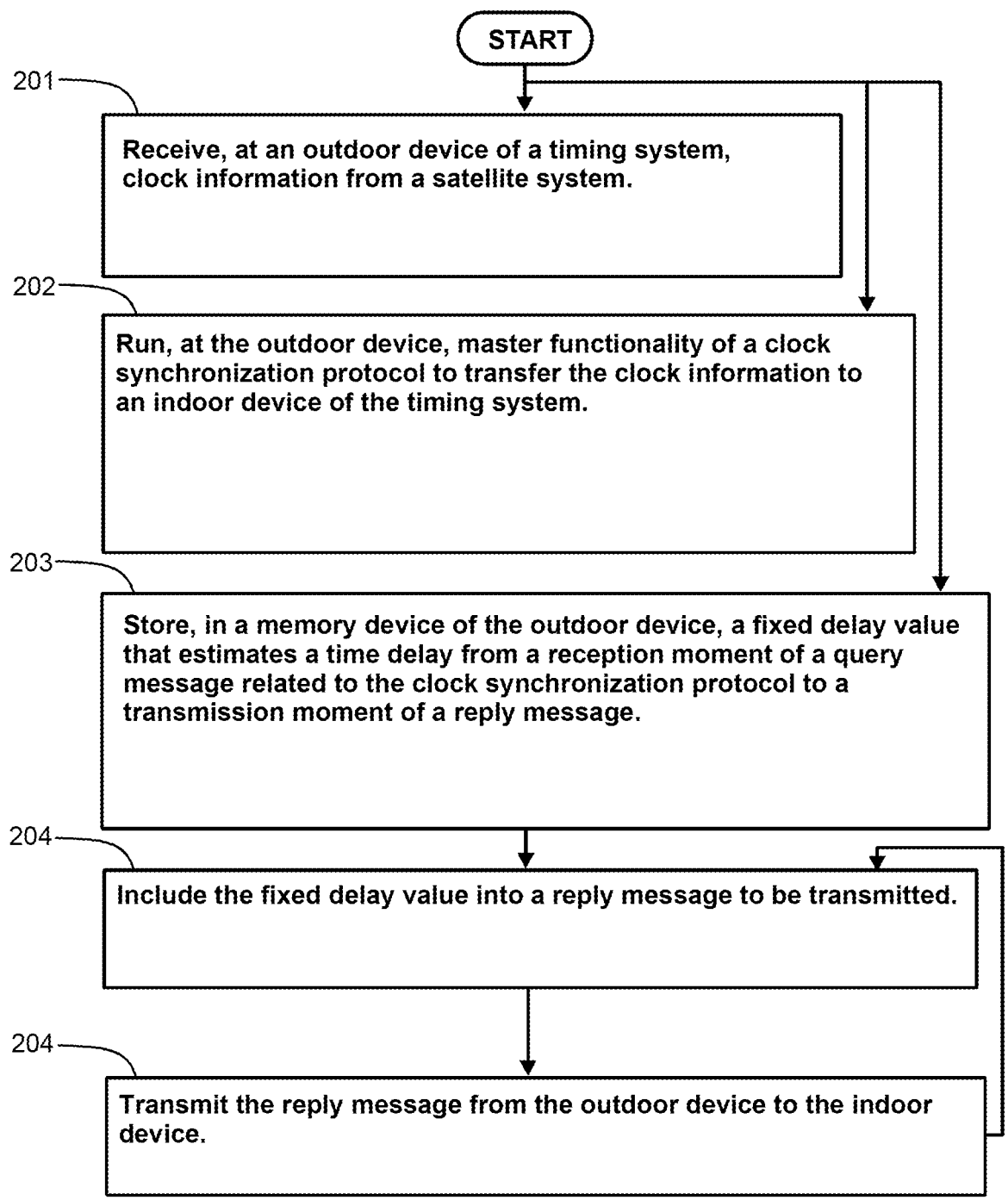

FIG. 2 shows a flowchart of a method according to an exemplifying and non-limiting embodiment for receiving clock information from a satellite system. The method comprises the following actions:
- action 201: receiving, at an outdoor device of a timing system, the clock information from the satellite system,
- action 202: running, at the outdoor device, master functionality of a clock synchronization protocol to transfer the clock information to an indoor device of the timing system,
- action 203: storing, in a memory device of the outdoor device, a fixed delay value estimating a time delay from a moment of reception of a request message related to the clock synchronization protocol at the outdoor device to a moment of transmission of a reply message from the outdoor device,
- action 204: including the fixed delay value into the reply message to be transmitted, and
- action 205: transmitting the reply message from the outdoor device to the indoor device.

A method according to an exemplifying and non-limiting embodiment comprises preparing a protocol data unit prior to a reception of a synchronization pulse from the satellite system and transmitting the prepared protocol data unit in response to the reception of the synchronization pulse from the satellite system.

In a method according to an exemplifying and non-limiting embodiment, the above-mentioned synchronization pulse is one pulse of a pulse per second signal.

A method according to an exemplifying and non-limiting embodiment comprises:
- computing a clock time value corresponding to a clock time at an upcoming moment of reception of a synchronization pulse from the satellite system, and
- including the computed clock time value into a protocol data unit when preparing the protocol data unit prior to the reception of the synchronization pulse.

In a method according to an exemplifying and non-limiting embodiment, the master functionality of the clock synchronization protocol is otherwise run in accordance with the IEEE1588 specification but the fixed delay value is included into each delay response message instead of a difference between a clock time at a moment of reception of a delay request message and a clock time at a moment of transmission of the delay response message.

In a method according to an exemplifying and non-limiting embodiment, data between the outdoor device and the indoor device is transferred via a cable link connected to the outdoor device and to the indoor device.

A method according to an exemplifying and non-limiting embodiment comprises stopping a transmit queue of data traffic other than data traffic related to the clock synchronization protocol in response to a reception of a synchronization pulse from the satellite system and allowing transmission of the other data traffic after transmission of a synchronization protocol data unit corresponding to the received synchronization pulse.

A computer program according to an exemplifying and non-limiting embodiment comprises computer executable instructions for controlling a programmable processing system to carry out actions related to a method according to any of the above-described exemplifying and non-limiting embodiments.

A computer program according to an exemplifying and non-limiting embodiment comprises software modules for controlling an outdoor device of a timing system to receive clock information from a satellite system and to transfer the clock information to an indoor device of the timing system. The software modules comprise computer executable instructions for controlling a programmable processing system of the outdoor device to:
- run master functionality of a clock synchronization protocol to transfer clock information received from the satellite system to the indoor device of the timing system,
- read, from a memory device, a fixed delay value estimating a time delay from a moment of reception of a request message related to the clock synchronization protocol at the outdoor device to a moment of transmission of a reply message from the outdoor device,
- include the fixed delay value into the reply message to be transmitted, and
- control the outdoor device to transmit the reply message from the outdoor device to the indoor device.

The software modules can be for example subroutines or functions implemented with programming tools suitable for the programmable processing system.

A computer program product according to an exemplifying and non-limiting embodiment comprises a computer readable medium, e.g. an optical disc, encoded with a computer program according to an exemplifying and non-limiting embodiment of the invention.

A non-transitory computer readable medium, e.g. an optical disc, according to an exemplifying and non-limiting embodiment is encoded with a computer program according to an exemplifying and non-limiting embodiment of the invention.

A signal according to an exemplifying and non-limiting embodiment is encoded to carry information defining a computer program according to an exemplifying and non-limiting embodiment of the invention.

The specific examples provided in the description given above should not be construed as limiting the scope and/or the applicability of the appended claims. Lists and groups of examples provided in the description given above are not exhaustive unless otherwise explicitly stated.

What is claimed is:

1. An outdoor device for a timing system configured to receive clock information from a satellite system, the outdoor device comprising:

a receiver configured to receive the clock information from the satellite system, a processor configured to run master functionality of a clock synchronization protocol to transfer the clock information to an indoor device of the timing system, a transceiver configured to transfer, via a data transfer link, data between the outdoor device and the indoor device in accordance with the clock synchronization protocol, and a memory device configured to store a fixed delay value estimating a time delay from a moment of reception of a request message related to the clock synchronization protocol at the transceiver to a moment of transmission of a reply message from the transceiver, wherein the processor is configured to include the fixed delay value into the reply message to be transmitted.

2. The outdoor device according to claim 1, wherein the processor is configured to prepare a synchronization protocol data unit prior to a reception of a synchronization pulse from the satellite system and to control the transceiver to transmit the prepared synchronization protocol data unit in response to the reception of the synchronization pulse from the satellite system.

3. The outdoor device according to claim 2, wherein the synchronization pulse is one pulse of a pulse per second signal.

4. The outdoor device according to claim 2, wherein the processor is configured to compute a clock time value corresponding to a clock time at an upcoming moment of reception of the synchronization pulse from the satellite system and to include the computed clock time value into the synchronization protocol data unit when preparing the synchronization protocol data unit prior to the reception of the synchronization pulse.

5. The outdoor device according to claim 3, wherein the processor is configured to compute a clock time value corresponding to a clock time at an upcoming moment of reception of the synchronization pulse from the satellite system and to include the computed clock time value into the synchronization protocol data unit when preparing the synchronization protocol data unit prior to the reception of the synchronization pulse.

6. The outdoor device according to claim 1, wherein the processor is configured to run the master functionality of the clock synchronization protocol otherwise in accordance with the IEEE1588 specification but the processor is configured to include the fixed delay value into a delay response message instead of a difference between a clock time at a moment of reception of a delay request message and a clock time at a moment of transmission of the delay response message.

7. The outdoor device according to claim 1, wherein the receiver comprises an antenna for receiving radio signals from the satellite system.

8. The outdoor device according to claim 1, wherein the transceiver is configured to transmit the data between the outdoor device and the indoor device via a cable link.

9. The outdoor device according to claim 1, wherein the processor is configured to stop a transmit queue of data traffic other than data traffic related to the clock synchronization protocol in response to a reception of a synchronization pulse from the satellite system and to allow transmission of the other data traffic after transmission of a synchronization protocol data unit corresponding to the received synchronization pulse.

10. A timing system for receiving clock information from a satellite system, the timing system comprising:

one or more outdoor devices each comprising a receiver configured to receive the clock information from the satellite system, an indoor device comprising a processor configured to run slave functionality of a clock synchronization protocol to receive the clock information from the one or more outdoor devices, and one or more data transfer links each being configured to transfer data between one of the outdoor devices and the indoor device, wherein each of the one or more outdoor devices further comprises:

a processor configured to run master functionality of the clock synchronization protocol to transfer the clock information to the indoor device, a transceiver configured to transfer, via the corresponding data transfer link, the data between the outdoor device and the indoor device in accordance with the clock synchronization protocol, and a memory device configured to store a fixed delay value estimating a time delay from a moment of reception of a request message related to the clock synchronization protocol at the transceiver to a moment of transmission of a reply message from the transceiver, wherein the processor is configured to include the fixed delay value into the reply message to be transmitted.

11. A method for receiving clock information from a satellite system, the method comprising:

receiving, at an outdoor device of a timing system, the clock information from the satellite system, running, at the outdoor device, master functionality of a clock synchronization protocol to transfer the clock information to an indoor device of the timing system, storing, in a memory device of the outdoor device, a fixed delay value estimating a time delay from a moment of reception of a request message related to the clock synchronization protocol at the outdoor device to a moment of transmission of a reply message from the outdoor device, including the fixed delay value into the reply message to be transmitted, and transmitting the reply message from the outdoor device to the indoor device.

12. The method according to claim 11, wherein the method comprises preparing a protocol data unit prior to a reception of a synchronization pulse from the satellite system and transmitting the prepared protocol data unit in response to the reception of the synchronization pulse from the satellite system.

13. The method according to claim 12, wherein the synchronization pulse is one pulse of a pulse per second signal.

14. The method according to claim 12, wherein the method comprises computing a clock time value corresponding to a clock time at an upcoming moment of reception of the synchronization pulse from the satellite system and including the computed clock time value into the protocol data unit when preparing the protocol data unit prior to the reception of the synchronization pulse.

15. The method according to claim 13, wherein the method comprises computing a clock time value corresponding to a clock time at an upcoming moment of reception of the synchronization pulse from the satellite system and including the computed clock time value into the protocol data unit when preparing the protocol data unit prior to the reception of the synchronization pulse.

16. The method according to claim 11, wherein the master functionality of the clock synchronization protocol is otherwise run in accordance with the IEEE1588 specification but the fixed delay value is included into a delay response message instead of a difference between a clock time at a moment of reception of a delay request message and a clock time at a moment of transmission of the delay response message.

17. The method according to claim 11, wherein data between the outdoor device and the indoor device is transferred via a cable link connected to the outdoor device and to the indoor device.

18. A non-transitory computer readable medium encoded with a computer program for controlling an outdoor device of a timing system to receive clock information from a satellite system and to transfer the clock information to an indoor device of the timing system, the computer program comprising computer executable instructions for controlling a programmable processor of the outdoor device to:

run master functionality of a clock synchronization protocol to transfer clock information received from the satellite system to the indoor device of the timing system, read, from a memory device, a fixed delay value estimating a time delay from a moment of reception of a request message related to the clock synchronization protocol at the outdoor device to a moment of transmission of a reply message from the outdoor device, include the fixed delay value into the reply message to be transmitted, and control the outdoor device to transmit the reply message from the outdoor device to the indoor device.

\* \* \* \* \*